(12) United States Patent
Malavasi et al.

(10) Patent No.: US 10,203,111 B2
(45) Date of Patent: Feb. 12, 2019

(54) COMBUSTION PROCESS

(75) Inventors: Massimo Malavasi, Milan (IT); Grazia Di Salvia, Bari (IT); Edoardo Rossetti, Bologna (IT)

(73) Assignee: ITEA S.p.A., Bologna (IT)

( * ) Notice: Subject to any disclaimer, the term of this patent is extended or adjusted under 35 U.S.C. 154(b) by 1740 days.

(21) Appl. No.: 12/744,677

(22) PCT Filed: Nov. 27, 2008

(86) PCT No.: PCT/EP2008/010096
§ 371 (c)(1),
(2), (4) Date: May 25, 2010

(87) PCT Pub. No.: WO2009/071239
PCT Pub. Date: Jun. 11, 2009

(65) Prior Publication Data
US 2010/0261127 A1 Oct. 14, 2010

(30) Foreign Application Priority Data
Dec. 6, 2007 (IT) .............................. MI2007A2290

(51) Int. Cl.
| | | |
|---|---|---|
| C10L 1/12 | (2006.01) | |
| F23J 7/00 | (2006.01) | |
| F23L 7/00 | (2006.01) | |
| C10L 1/10 | (2006.01) | |
| C10L 10/00 | (2006.01) | |
| C10L 10/02 | (2006.01) | |
| C10L 10/04 | (2006.01) | |
| F23G 7/00 | (2006.01) | |
| C10L 1/198 | (2006.01) | |
| C10L 1/24 | (2006.01) | |

(52) U.S. Cl.
CPC ................ F23L 7/007 (2013.01); C10L 1/10 (2013.01); C10L 10/00 (2013.01); C10L 10/02 (2013.01); C10L 10/04 (2013.01); F23G 7/00 (2013.01); F23J 7/00 (2013.01); C10L 1/125 (2013.01); C10L 1/1208 (2013.01); C10L 1/1275 (2013.01); C10L 1/1985 (2013.01); C10L 1/2406 (2013.01); C10L 1/2437 (2013.01); F23G 2202/30 (2013.01); Y02E 20/342 (2013.01); Y02E 20/344 (2013.01)

(58) Field of Classification Search
USPC .............................. 431/4; 110/342; 422/171
See application file for complete search history.

(56) References Cited

U.S. PATENT DOCUMENTS

| | | | | |
|---|---|---|---|---|
| 3,692,503 A | | 9/1972 | Kukin | |
| 4,090,854 A | * | 5/1978 | Davis | 44/304 |
| 4,096,235 A | * | 6/1978 | Cross et al. | 423/166 |
| 4,129,589 A | * | 12/1978 | Eliades et al. | 562/33 |
| 4,148,356 A | * | 4/1979 | Cramer | 165/111 |
| 4,255,162 A | * | 3/1981 | Moss | C01B 17/06 208/226 |
| 4,400,181 A | * | 8/1983 | Snell | C10J 3/54 48/197 R |
| 4,436,530 A | * | 3/1984 | Child | C10J 3/466 252/373 |
| 4,472,267 A | * | 9/1984 | Yoo | B01J 21/005 208/113 |
| 4,512,774 A | | 4/1985 | Myers et al. | |
| 4,517,165 A | * | 5/1985 | Moriarty | F23C 6/04 110/342 |
| 4,523,532 A | * | 6/1985 | Moriarty | 110/347 |
| 4,530,701 A | * | 7/1985 | Koskan et al. | 44/281 |
| 4,542,704 A | * | 9/1985 | Brown et al. | 110/347 |
| 4,579,070 A | * | 4/1986 | Lin et al. | 110/345 |
| 4,597,770 A | * | 7/1986 | Forand et al. | 44/280 |
| 4,784,670 A | * | 11/1988 | Najjar | C01B 3/36 48/197 R |
| 4,881,476 A | * | 11/1989 | Becker et al. | 110/347 |
| 4,917,024 A | * | 4/1990 | Marten | B01D 53/501 110/229 |
| 5,283,368 A | * | 2/1994 | Shaw | 568/45 |
| 5,358,626 A | * | 10/1994 | Gandman et al. | 208/48 R |
| 5,372,613 A | * | 12/1994 | Mekonen | C10L 1/328 44/301 |
| 5,458,803 A | * | 10/1995 | Oehr | 252/192 |
| 5,480,624 A | * | 1/1996 | Kuivalainen | 423/210 |
| 5,645,805 A | * | 7/1997 | Oehr | B01D 53/60 252/192 |
| 5,690,482 A | * | 11/1997 | Shessel | F01K 23/067 431/10 |
| 5,795,548 A | * | 8/1998 | Madden et al. | 422/171 |
| 5,814,288 A | * | 9/1998 | Madden et al. | 423/244.01 |
| 5,862,858 A | * | 1/1999 | Wellington | E21B 43/24 166/59 |
| 6,074,445 A | * | 6/2000 | Ahmed | 44/385 |
| 6,372,187 B1 | * | 4/2002 | Madden et al. | 422/171 |
| 7,614,352 B2 | * | 11/2009 | Anthony | B01D 53/508 110/101 CF |
| 2002/0015670 A1 | * | 2/2002 | Shah et al. | 422/198 |
| 2002/0102189 A1 | * | 8/2002 | Madden et al. | 422/168 |
| 2004/0068988 A1 | * | 4/2004 | Anderson | B01D 53/68 60/651 |
| 2006/0011517 A1 | * | 1/2006 | Feimer | 208/231 |

(Continued)

FOREIGN PATENT DOCUMENTS

WO    WO 2005108867 A1 * 11/2005 ................ F23L 7/00

*Primary Examiner* — Avinash Savani
*Assistant Examiner* — Rabeeul Zuberi
(74) *Attorney, Agent, or Firm* — Arent Fox LLP

(57) ABSTRACT

A combustion process wherein a fuel, a comburent and a component B), sulphur or sulphur containing compounds, are fed to the combuster in an amount to have a molar ratio $B'/A^I \geq 0.5$, wherein: B' is the sum by moles between the amount of sulphur present in component B)+the amount of sulphur (component $B^{II}$)) contained in the fuel, $A^I$ is the sum by moles between the amount of alkaline and/or alkaline-earth metals (component $A^{II}$)) contained in the fuel+the amount of the alkaline and/or alkaline earth metals (component A)) in the form of salts and/or oxides contained in component B), being the combustor isothermal and flameless.

13 Claims, No Drawings

(56) References Cited

U.S. PATENT DOCUMENTS

| | | |
|---|---|---|
| 2006/0059768 A1 | 3/2006 | Wallenbeck et al. |
| 2007/0027057 A1* | 2/2007 | Le Coent ............. C10M 159/22 |
| | | 510/505 |
| 2007/0039527 A1* | 2/2007 | Malavasi et al. ............. 110/346 |
| 2007/0134147 A1* | 6/2007 | Graville ............. B01D 53/8612 |
| | | 423/242.1 |
| 2010/0248168 A1* | 9/2010 | Malavasi .................. C10L 1/10 |
| | | 431/2 |

* cited by examiner

COMBUSTION PROCESS

CROSS-REFERENCE TO RELATED APPLICATION

This application is a National Stage entry of International Application No. PCT/EP2008/010096, filed Nov. 27, 2008, which claims priority to Italian Patent Application No. MI2007A002290, filed Dec. 6, 2007. The disclosure of the prior application is hereby incorporated in its entirety by reference.

The present invention relates to a process for substantially reducing the basic ashes contained in the fumes from combustors.

The basic ashes are generally formed of alkaline and/or alkaline-earth metal oxides and/or salts thereof, in particular oxides, carbonates, etc., that as well known, belong to the incombustible ash class (ISO 1171).

More specifically the present invention allows to obtain also the transformation of basic ashes (alkaline ashes), generally contained in fuels into non aggressive compounds at the combustion temperatures, towards the construction materials of combustors and heat recovery plants that are downstream the combustor. Because of this, low ranking fuels, as biomasses and wastes, can also be used in plants built with conventional materials, as for example AISI 304H steel, having a high thermal recovery yield and a high transformation yield of thermal energy into electric energy.

The presence of incombustible ashes, both the heavy (i.e. non volatile) ones and fly ash, has always represented a technological problem in the combustion plants. They have determined the classification of the fossils fuels as it is known today.

The basic portion, in particular that deriving from sodium and potassium compounds, of the ashes of fossil fuels, biomasses and wastes, causes in the flame front combustion the formation of oxides and salts, sometimes partially melted.

These compounds are particularly aggressive at high temperatures towards the materials of the walls of the combustion chambers and of the thermal recovery plants. The walls are coated with refractories, generally in aluminum compounds and/or silico-aluminum compounds, optionally containing chromium and zirconium, or metallic materials, as for example steels, alloys, metals, in thermal recovery plants. As said, the basic ashes are capable to corrode the refractory materials by melting them. In the prior art in order to increase the refractory resistance, it has been indicated the use of 99.8% tabular $Al_2O_3$ so to reduce the silica content to very low values, or to add zirconium oxides in the refractory composition. However also these modified refractories do not allow to solve the problem of the corrosion of the combustor walls due to the basic ashes.

It is also known in the prior art to use for the manufacture of the walls of thermal recovery plants, AISI 304H steel, more preferably Inconel. The latter has been found to be more resistant to the corrosion of basic ashes in comparison with AISI 304H. However the use of Inconel material has the drawback that the building costs of the plant notably increase.

It is to be observed furthermore that some of the compounds forming the basic ashes develop vapours at the combustion temperature and then, when the fumes cool, said vapours solidify. This causes the corrosion of the walls of the thermal recovery plants. Besides, agglomerates/deposits are formed in the pipes and in the plants that can clog the equipment in the time. For example, when the basic ashes contain sodium or potassium in the form of chloride salts, they melt at a relatively low temperature (<1,100° K.) and they attacking the combustor walls. Besides, they evaporate due to a significant partial pressure at a relatively low temperature (<1,300 K) and recrystallize on the equipment surfaces located downstream of the combustors. On this ground the equipments are irremediably damaged. This represents a notable drawback from an industrial point of view.

It is well known in the prior art fuels containing high amounts of basic ashes, for example some types of low ranking coals and crude oils. However all the fuels contain in a variable amount basic ashes.

In order to reduce the corrosive action of basic ashes, it has been suggested in the prior art to use in combustors low combustion temperatures, generally between 650° C. and 800° C. The advantage is the reduction of basic ash in the fumes. This allows to overcome the above described drawbacks. However under these conditions toxic uncombusted compounds, as dioxins, furans, polyaromatics, etc., are produced in high amounts in the combustor.

In order to reduce the inconveniences due to the basic ashes in the combustors in the industry it has been suggested to gasify at low temperatures the solid fuels, bituminous and/or carbonaceous shales. However these processes have the drawback to require an additional plant for the gasification. In any case the basic ashes are present in the synthesis gases obtained in gasifiers. Therefore the problem is not solved but shifted to the downhill plants. It is also known that it is possible to purify the synthesis gases by hot gas cleaning processes. This however requires specific units which are costly and have besides very reduced service life. When the cleaning treatments are carried out at temperatures lower than those employed in plants using synthesis gases, there is the drawback that thermal efficiency is reduced.

In the prior art it has furthermore been suggested to remove from solid or liquid fuels before combustion the precursors of the basic ashes. This is not achievable from an industrial point of view because of the remarkable complexity of said cleaning processes, due to the high number of compounds present in fuels. Till today the feeding of thermal power plants has been carried out by using coals and hydrocarbons with a low alkaline and/or alkaline-earth metal content. However these fuels are very valuable and expensive, besides they are available in not high amounts.

The need was felt to have available an industrial process for reducing and/or substantially removing the corrosion of basic ashes on the combustor walls, and on the surfaces of the thermal recovery plants downhill of the combustor.

It has been unexpectedly and surprisingly found by the Applicant a process solving the above mentioned technical problem.

An object of the present invention is a combustion process wherein a fuel, a comburent and a component B), sulphur or sulphur containing compounds, are fed to the combustor in an amount to have a molar ratio $B'/A^I \geq 0.5$, wherein:

B' is the sum by moles between the amount of sulphur present in component B)+the amount of sulphur (component $B^{II}$)) contained in the fuel, $A^I$ is the sum by moles between the amount of alkaline and/or alkaline-earth metals (component $A^{II}$)) contained in the feeding fuel+the amount of the alkaline and/or alkaline-earth metals (component A)) contained in component B), being the combustor isothermal and flameless.

Sulphur (component $B^{II}$)) in fuel can be present under the form of elementary sulphur or of organic and/or inorganic compounds containing sulphur.

In the fuel the alkaline and/or alkaline-earth metals (component $A^{II}$)) are generally present in the form of salts, mixed salts, oxides or mixed oxides.

In the process of the invention the combustor pressure is preferably higher than or equal to 101.3 kPa up to about 2,000 kPa.

In the process of the invention the combustor temperature is preferably comprised between 1,500 K (1,223° C.) up to 2,100 K (1,827° C.).

The comburent of the invention process is preferably oxygen, for example high purity oxygen (98.5% by volume) can be used. Generally oxygen having titre 88-92% VSA (vacuum swing absorption) and 88-92% VPSA (vacuum pressure swing absorption) can also be used. Preferably the lowest limit of the oxygen titre is 70% by volume, the complement to 100% being formed of inert gases and/or nitrogen. The comburent in the process of the invention is preferably used in molar excess with respect to the stoichiometric amount required for the combustion reaction with the fuel. However it can also be used in defect with respect to the stoichiometric amount.

When in fuel basic ashes the metals present are monovalent metals only, the $B^I/C^I$ ratio is preferably higher than 0.5, when the metals present are bivalent metals only, the $B^I/A^I$ ratio is at least 1.

Preferably the molar ratio $B^I/A^I$ is at least 0.7, more preferably at least 1, still more preferably at least 2.

An upper limit can be any value, for example molar ratios of 10 or 100 can also be used. It is to be noticed, however, that it is preferable not to use high amounts of sulphur, since in said cases plants for removing the sulphur in excess are required downhill of the combustor.

Preferably the combustion gases at the combustor outlet are cooled at a temperature equal to or lower than 1,100 K, in any case lower than the solidification temperature of the condensed vapours of melted ashes. This is an advantage since thermal recovery plants and rotating machines made of conventional materials, can be used.

The addition of component B) to the combustor can be carried out by feeding the component B) separately from the fuel preferably in admixture with the fuel. When component B) is elementary sulphur, it can be fed as a surfactant containing aqueous dispersion. Suitable surfactants are arylalkyl- or alkylarylsulphonates, polyethoxylates, etc.

Preferably the amount of component B) used is such that in the combustion fumes the partial pressure of $SO_2$ that is formed is higher than 0.0004 bar (40 Pa), preferably up to 0.003 bar (300 Pa). Component B), as for example sulphur, is dosed as $SO_2$ in the combustion fumes. The process control is preferably carried out by using codes (control software) requiring a characteristic response time of about 10 seconds. To this purpose the fumes at the outlet of the combustor are monitored by a multiple gas analyzer, NDIR type (Non Dispersive InfraRed)/NDUV (Non Dispersive Ultra Visible), modified to give a response time T95 of 1.5 seconds.

As component B) instead of sulphur, sulphur containing organic and/or inorganic compounds can be used. For example sulphites, bisulphites, hydrogen sulphide, sulphates, mercaptans, etc. can be used.

Furthermore it has been unexpectedly and surprisingly found by the Applicant that, even when using very high $B^I/A^I$ ratios, therefore very high sulphur amounts, no corrosion of the combustor walls and of the thermal recovery plant walls downhill of the combustor is observed.

In the process of the invention the residence time of the fuel in the combustor ranges from 0.5 seconds up to 30 minutes or more, preferably from 2 to 10 seconds. Higher residence times can also be used without however obtaining a substantial variation of the results.

The Applicant has surprisingly and unexpectedly found that by operating in the above mentioned conditions, the fumes coming out from the combustor are substantially aggressive basic ash-free. It has been found that the walls of the combustor and of the thermal recovery plants remain substantially unaffected. They are neither attacked by the basic ashes nor by the combination of the basic ashes with other components present in the fuels, as for example vanadium. In fact it has been surprisingly and unexpectedly found that the basic ashes are transformed by the process of the invention into inert compounds which neither attack the refractories of the combustor walls, nor the metallic materials, in particular steels and metallic alloys which, as said, form the walls of the plants downhill of the combustor. The Applicant has surprisingly and unexpectedly found that it is possible to use in the plants downhill of the combustor, for example the thermal recovery plants, also metal alloys as for example AISI 304H steel in operating conditions wherein in the prior art alloys having a high nickel content, as Inconel and Hastelloy, were requested. This is a remarkable advantage since it allows to save costs.

As fuels, biomasses, for example deriving from sugars, animal meals, carbon, industrial scraps from neutralization reactions, high-boiling refinery fractions, bitumens and oil shales, processing scraps of tar sands, peats, exhausted solvents, pitches, in general industrial process scraps and wastes, including the residual fractions from urban scraps, optionally comprising CDR (fuel from scraps), can be mentioned. Emulsions of liquid fuels of oil origin can also be mentioned. All these fuels, as already said, contain basic ashes generally in the form of oxides and/or salts.

As said, the combustor used in the process of the present invention is isothermal and flameless, since it is operated at temperatures equal to or higher than 1,500 K, preferably higher than 1,700 K up to 2,100 K, and at a pressure higher than 101.3 kPa (1 bar), preferably higher than 200 kPa, still more preferably higher than 600 kPa and up to 2,026 kPa.

The isothermal combustor used in the process of the invention is described in the patent application, herein incorporated by reference, WO 2004/094,904 in the name of the Applicant.

When the fed fuel is introduced into the isothermal combustor in admixture with water and/or steam, the combustor operates as described in patent application WO 2005/10,8867.

Preferably the fed comburent oxygen is premixed with recycling fumes. The fume amounts are generally higher than 10% by volume, preferably higher than 50% by volume. The recycling fumes preferably contain also water, in the form of vapour, generally in amounts, calculated on the total volume of the recycling fumes, higher than 10% by volume, preferably higher than 20% by volume, still more preferably higher than 30% by volume.

The fed comburent can also be in admixture with steam, which can partially or totally substitute the recycling fumes.

The feeding fuel can contain also water/water vapour in an amount, depending on the type of fuel used. The percentage of water in the fuel, expressed as percent by weight, can also be up to 80% and even higher, with the proviso that the value of the lower heating power (LHV)>6,500 kJoule/Kg of fed mixture.

The gases at the outlet of the combustor are cooled by mixing them in a mixer with recycling gases, up to reaching a final temperature lower than 1,100 K. This allows to solidify the vapours of alkaline and alkaline metal salts and oxides. The fumes can be conveyed to a heat exchanger wherein water is fed to produce steam. The fumes which have been submitted to the heat transfer step are compressed again for recycling to both the combustor and to the mixer at the combustor outlet. Preferably the fume portion corresponding to the net fume production of the combustion is expanded for obtaining mechanical work and then sent to a fume post-treatment unit. The fumes to be expanded are taken in correspondence of the mixer outlet. The expansion can be achieved by using a turboexpander, since the fumes are substantially fly-ash free.

In the lower part of the combustor a collection vessel for the melted ashes is provided. The ashes are then cooled, for example in a water bath, and transferred in a solid vitrified state into static settlers.

As said, in the process of the invention the aggressive basic ashes are transformed into chemical species which are no longer aggressive towards materials forming the walls of the combustor and of the plants connected thereto.

The following examples illustrate for non limitative purposes the present invention.

EXAMPLES

Example 1

Analytical Methods

The metal analysis is carried out by induction-plasma spectroscopy by using the ICP-OES instrument by Thermo Electron Corporation.

The basic ashes are determined as alkaline and earth-alkaline metals.

Total ashes are determined as the weight residue after igniting at 600° C. according to conventional analytical procedures.

Sulphur or sulphate are determined by chemical analysis.

Moisture was determined according to conventional analytical procedures, for instance by using Karl Fischer instrument.

Example 2

The combustor is a isothermal and flameless 5 MW combustor with walls coated by refractory, operated at 1,650° C. and 400 kPa. The comburent used is oxygen at 90% by volume and is fed in excess on the stoichiometric amount, so to have an oxygen concentration in the fumes coming out from the combustor comprised between 1% and 3% by volume.

The fuel is olive husk having a content of sulfur, total ashes and humidity as it follows (% by weight):

| | |
|---|---|
| sulphur | 0.1 |
| total ashes (residue at 600° C.) | 5 |
| humidity | 9 |

Metal k, Na, Ca, Mg, calculated as % by weight on the total ashes, are in the following amounts.

| | |
|---|---|
| K | 18.3 |
| Na | 1.1 |
| Ca | 12.8 |
| Mg | 1.2 |

Alkaline and earth-alkaline metal represent the basic ashes.

The sum of the amounts of alkaline and earth-alkaline metal constitute 33.4% by weight of the total ashes.

On the total ashes, sulphate determination has been carried out. The amount found was 4.7% by weight.

The comburent oxygen was fed to the combustor in an amount in excess with respect to the stoichiometric value, so to have an oxygen concentration in the fumes coming out from the combustor comprised between 1% and 3% by volume.

In a reactor olive husk was admixed with water, under stirring, to form a slurry containing water in an amount equal to 60% by weight of water on the dry olive husk.

In a reactor, under stirring, a water dispersion was prepared by adding a solid mixture formed by sulphur in powder with sodium alkylarylsulphonate surfactant to water.

The olive husk slurry was fed to the combustor at a rate of 1,200 kg/hour, calculated on the dry olive husk.

The aqueous dispersion of sulphur was fed to the combustor in an amount of 18 kg of sulfur/hour.

The ratio by moles $B^I/A^I$ is 1.1. The combustor has worked for 480 hours.

Every 8 hours about 550 kg of vitrified slags, containing the metals K, Na, Ca and Mg in the same ratios and amounts as in the ashes of the fed fuel, are discharged from the combustor.

It is found that the fumes emitted into the air contain an ash amount lower than 3 mg/Nm$^3$.

At the end of the combustion process no corrosion of the refractory of the combustor walls is noticed. Furthermore, in the vapour superheater made of AISI 304H material and operating with fumes at 800° C. and at wall temperatures of 570° C., that is located in the part of the heat recovery plant downhill of the combustor, no surface modification of the wall material can be found.

Example 3 Comparative

The combustor is operated as in example 2 but without feeding sulphur. The combustor is runned for 72 hours.

In the fumes coming out from the combustor, $SO_2$ is in concentrations<30 ppv, corresponding to 0.00014 bar, 14 Pa.

At the end of the running period the combustor and the fume pipe at the outlet, both having the interior walls protected by refractories, are visually inspected. It is noticed that the refractory material made of high-fired bricks (high purity alumina containing 9% by weight of chromium, 6% by weight of zirconium), has been corroded on the surface. Further the slags discharged from the combustor contain a chromium and zirconium concentration higher than that present in the ashes of the fed fuel. Therefore the excess of chromium and zirconium derives from the corrosion of the refractory material of the combustor.

Example 4 Comparative

The combustor is operated as in example 2. The fuel consists of scrap phenolic pitches originating from a petrochemical plant producing bisphenol A, and is fed by a melter. The pitches contain basic ashes in an amount of 0.8% by weight as sodium, and do not contain sulphur. The melted pitches are fed at a flow rate of 500 liters/hour (pitch density about 0.98 g/cm³). After 2 running hours melted slags came out at the bottom of the combustor. The plant is stopped and melted slags analyzed. They are constituted of sodium aluminate. Metal analysis has given the following results: sodium 6% by weight, chromium 8% by weight, zirconium 6% by weight. The composition aluminum/chromium/zirconium is similar to the composition of the refractory bricks of the combustor. Therefore the refractory of the combustor walls has been leached by the basic ashes contained in the fuel.

Example 5

Example 4 Comparative is repeated but using phenolic pitches contain basic ashes in an amount of 0.4% by weight as sodium and not containing sulphur.

The combustor temperature was of 1,550 K.

The comburent used is oxygen at 90% by volume and is fed in excess on the stoichiometric amount. The process lasted 5 running days and sulphur was fed as an aqueous dispersion using alkylarylsulphonate surfactant at a rate of 5.5 Kg/hour.

The molar ratio $B'/A^I$ is 2/1.

During the running time, at the bottom of the combustor slags are obtained. They were analyzed and shown to contain the basic ashes introduced in the combustor under the form of sodium sulphate. The plant is stopped and the combustor is inspected. It is observed that the refractory of the combustor walls does not show any corrosion.

The invention claimed is:

1. A combustion process for reducing basic ashes in combustion fumes, comprising feeding into a combustor a fuel, a comburent and a component B), wherein combustion fumes comprising $SO_2$ are output from the combustor, wherein component B) is selected from sulfur or sulfur containing compounds, and component B) is added in an amount to have a molar ratio $B'/A^I \geq 0.5$, wherein:

B' is the sum by moles between the amount of sulfur present in component B)+the amount of sulfur contained in the fuel, $A^I$ is the sum by moles between the amount of alkaline and/or alkaline-earth metals contained in the fuel+the amount of the alkaline and/or alkaline-earth metals contained in component B), being the combustor is isothermal and flameless, the comburent being in molar excess with respect to the stoichiometric amount required for the combustion reaction with the fuel, and wherein the partial pressure of $SO_2$ ranges from 40 to 300 Pa.

2. A process according to claim 1, wherein sulfur in the fuel is present under the form of elementary sulfur or of organic and/or inorganic compounds containing sulfur.

3. A process according to claim 1, wherein in the combustor the pressure is comprised between values higher than 101.3 kPa and up to 2,000 kPa, and the temperature is comprised between 1,500 K up to 2,100 K.

4. A process according to claim 1, wherein the comburent comprises oxygen having a titer of at least 70% by volume, the complement to 100% being formed of an inert gas and/or nitrogen.

5. A process according to claim 1, wherein the molar ratio $B'/A^I$ is at least 1.

6. A process according to claim 1, wherein the combustion fumes at the outlet of the combustor are cooled at a temperature equal, to or lower than 1,100 K.

7. A process according to claim 1, wherein the feeding of component B) to the combustor is carried out by feeding the component B) separately from the fuel or in admixture with the fuel.

8. A process according to claim 1, wherein component B) is elementary sulfur and is fed to the combustor with aqueous dispersion containing surfactants.

9. A process according to claim 1, wherein the residence time of the fuel in the combustor ranges from 0.5 seconds up to 30 minutes.

10. A process according to claim 4, wherein the combustion fumes are recycled.

11. A process according to claim 10, wherein the fed oxygen is premixed with the recycled fumes, the amount of combustion fumes being higher than 10% by volume, preferably higher than 50% by volume.

12. A process according to claim 10, wherein the recycling fumes contain water in the vapor form, the water amount, calculated with respect to the total volume of the recycling fumes, being higher than 10% by volume.

13. A process according to claim 12, wherein the fuel contains an amount of water up to 80% by weight.

* * * * *